United States Patent
Hawes

[11] 3,737,235
[45] June 5, 1973

[54] POLARIZATION INTERFEROMETER WITH BEAM POLARIZING COMPENSATOR

[75] Inventor: Roland C. Hawes, Monrovia, Calif.

[73] Assignee: Cary Instruments, Monrovia, Calif.

[22] Filed: Feb. 10, 1972

[21] Appl. No.: 225,238

[52] U.S. Cl. ............. 356/114, 356/33, 356/201, 350/150, 350/157, 350/159
[51] Int. Cl. ............................................. G01n 21/40
[58] Field of Search ................. 356/33, 114, 115, 356/117, 201; 350/150, 157, 159

[56] References Cited
UNITED STATES PATENTS

| | | | |
|---|---|---|---|
| 3,637,311 | 1/1972 | Tipotsch | 356/114 |
| 3,586,443 | 6/1971 | Hooper | 356/114 |
| 3,540,827 | 11/1970 | Badoz et al. | 356/114 |
| 3,183,763 | 5/1965 | Koester | 356/33 |

Primary Examiner—Ronald L. Wibert
Assistant Examiner—Paul K. Godwin
Attorney—William W. Haefliger, H. Calvin White and Louis J. Bachand, Jr.

[57] ABSTRACT

Dichroism measurement apparatus includes interferometer means for processing linearly polarized source radiation to provide a beam characterized, for each wavelength, by ellipticity that alternates between left and right circular polarization and between which the beam polarization becomes linear in one direction as the ellipticity alternates from left to right circular polarization, and linear in the orthogonal direction as the ellipticity alternates from right to left circular polarization, the characteristic frequency $\nu_a$ of such alternation varying as a function of the wavelength. The interferometer means comprises relatively fixed and movable prisms, both having axes at 45° to the linear polarization direction, and actuating means for effecting such relative movement of said prisms to control the frequencies $\nu_a$.

8 Claims, 6 Drawing Figures

POLARIZATION INTERFEROMETER WITH BEAM POLARIZING COMPENSATOR

BACKGROUND OF THE INVENTION

This invention relates generally to apparatus for measuring polarization-dependent optical properties of samples, and more particularly concerns the application of interferometric techniques with associated scanning in such measurements.

In the past, and as exemplified in U.S. Pat. No. 3,257,894, the measurement of circular dichroism (a very useful optical property of substances, and defined as the difference in absorption of an optically active sample when determined using left-circularly polarized light and right-circularly polarized light), has involved the step of obtaining the ratio of alternating and direct current components of an electrical signal obtained at the output of a detector such as a phototube. Light incident upon the detector, and resulting in production of that signal, is typically derived by transmission as a beam from a source including a monochromator and through a polarizer, then through a polarization or electro-optic modulator wherein the plane polarized light is elliptically polarized in a cyclically varying manner (characterized by two counter-rotating, circularly polarized components, the relative magnitudes of the two components changing cyclically in time—at a "modulation frequency"—so that the dominant component is alternately right- and left-circularly polarized), and finally through a sample. The latter, when circular-dichroic, absorbs unequally the circularly polarized components of opposite sense and of periodically varying polarization, so that the total amount of light incident upon the phototube undergoes a corresponding periodic variation, i.e. larger when the predominant circularly polarized component of the light passing through the sample is of the sense absorbed to lesser degree by the sample, and smaller when the predominant circularly polarized component is of the sense absorbed to greater degree by the sample. The fluctuating component of the phototube output is of frequency equal to the modulation frequency and with amplitude proportional to the difference between transmission levels for the circularly polarized components of opposite sense. The DC component on the other hand corresponds to the average of mean transmission of the sample for light at the wavelength of interest.

The above and similar systems require the provision of much expensive equipment, including the monochromator and electro-optic modulator. While much thought has been given to the possible elimination of such equipment, the principles of operation as outlined above remain embodied in existing apparatus for measuring dichroism in samples, i.e. successful substitutes have not been found.

Equipment for measuring circular dichroism is usually easily adapted to the measurement also of linear dichroism, defined as the difference in absorption of a sample for linearly polarized light with the direction of polarization corresponding to maximum absorption by the sample and a direction orthogonal to the maximum absorption direction. Linear dichroism is another useful optical property of substances and is the property upon which, for instance, the useful characteristics of sheet polarizers such as "Polaroid" depend. It may be measured by the equipment described above by introducing a ¼ wave "bias" in the polarization characteristics of the light beam by superimposing a sufficient unidirectional potential upon the electro-optical modulator in addition to the alternating potential, or by inserting in the light beam a ¼ wave retarder of conventional design. The light beam passing through the sample then varies cyclically between two orthogonal linearly polarized components. At the modulation frequency a linearly dichroic sample absorbs these two components unequally producing corresponding periodic variations in the amount of light incident upon the phototube.

Existing systems, as will be evident from the above description, also are limited in that measurements of dichroism spectra must be made one wavelength band at a time, the bands being changed in succession by a scanning mechanism in the monochromator. This is particularly troublesome in the infrared region of the spectrum where, owing to the very small amounts of dichroism ordinarily encountered, and to the below mentioned "constant noise" property of usual photometric detection systems, a very long time must be taken for the measurement at each wavelength band in order to accumulate enough information to permit accurate estimates of such small differences in absorption.

In ordinary absorption measurements, it has been known for some time that by using methods commonly called "Fourier spectroscopy," employing an interferometer, measurements could be made at many wavelengths simultaneously, each wavelength being characterized by a different signal frequency imposed on the radiation falling on the detector. The signals are subsequently "sorted out" according to frequency by a mathematical process characterized by taking the inverse Fourier transform of the signals collected and electrically recorded from the detector. By making measurements at many wavelengths simultaneously, it is possible to obtain as accurate or more accurate measurements at each wavelength as could have been obtained in the same time at a single wave band with the use of monochromator for wave band isolation, assuming constant detector noise, equal optical bandwidth or resolution, equal transmission efficiency, and equal "light grasp" or "throughput".

Another advantage of interferometric modulation lies in the fact that it is practical for a given resolving power of the apparatus to transmit more radiation through an interferometer than through a monochromator. This is for two reasons: The first is that the "light grasp", that is, the geometrical factor determining the capability of the apparatus to transmit radiation, is recognized to be greater for an interferometer than for a monochromator. The second is that the monochromator usually contains many more optical elements, each of which introduces some loss in the system; thus, the transmission efficiency of the monochromator can easily be less even for a given single wavelength than that for an interferometer despite the fact that a typical beam splitter in an interferometer reduces the light intensity transmitted through the interferometer by a factor of two at the beam recombining point, half of the radiation being returned toward the source.

Prior to the invention disclosed in that certain Roland C. Hawes application for U.S. Letters Patent Ser. No. 48,415, filed June 22, 1970, and entitled, "Polarization Interferometer," no way was known, to my knowledge to apply the above interferometric modulation technique to the measurement of circular dichroism. The Hawes application discloses an interference polarization modulator, including relatively movable reflectors for processing source light, and characterized by production of negligible amplitude modulation in the absence of dichroism in the optical train that follows the modulator and in the detector. Either linear or circular dichroism in that region of the instrument, however, will convert the polarization modulation into amplitude modulation. The polarization modulation is characterized by a different frequency for each wavelength of the radiation; thus, the signals caused by the interaction of the radiation with dichroic sample may all be recorded simultaneously and may subsequently be "unscrambled" by simple electronic frequency isolation, or, preferably, by the use of a computer to derive the inverse Fourier transform of the ensemble of frequencies constituting the complete signal, and thus obtaining a transmission spectrum corresponding to the dichroism. The transmission spectrum in turn, in the case of the circular dichroism, may be converted into dichroism by dividing by the ordinary transmission spectrum (corresponding to ordinary absorption) which may be derived by ordinary Fourier spectroscopy.

While the specific polarization interferometer means described in said Hawes application has certain unusual advantages, there are additional unusual advantages associated with the interferometer means described herein.

SUMMARY OF THE INVENTION

It is a major object of the invention to provide interferometer means of improved design in dichroism measurement apparatus of the above type. Generally speaking, that apparatus will include:

a. a source of electromagnetic radiation of different wavelengths $\lambda$, b. a linear polarizer operable upon the source radiation to linearly polarize same, c. the improved interferometer means for processing source radiation to provide a beam characterized, for each wavelength, by ellipticity that alternates between left and right circular polarization and between which the beam polarization becomes linear in one direction as the ellipticity alternates from left to right circular polarization, and linear in another direction as the ellipticity alternates from right to left circular polarization, the characteristic frequency $\nu_a$ of such alternation varying as a function of the wavelength, d. a sample space located for effecting passage of the elliptically polarized beam through a dichroic sample in that space, the sample differentially absorbing the alternately polarized radiation of a characteristic set of wavelengths $\lambda$, and d. a beam intensity detector located in the path of the beam passing from the sample space and characterized as having signal output that varies in intensity with frequency $\nu_a$ when the sample is in the sample space, that output adapted for processing to produce dichroic spectra varying with wavelength $\lambda$.

As will be seen, the improved interferometer means comprises relatively fixed and movable prisms, both made of the same birefringent uniaxial solid and having parallel axes, at 45° to the polarization direction of the linearly polarized radiation. Also, actuating or scanning means may be provided to effect such relative movement of the prisms as to control the frequencies $\nu_a$. In general, in order to permit inclusion during the scan of the zero retardation position, the prisms are supplemented by a plate having its axis perpendicular to that of the two prisms.

These and other objects and advantages of the invention, as well as the details of illustrative embodiments, will be more fully understood from the following description and drawings, in which:

DRAWING DESCRIPTION

DETAILED DESCRIPTION

Figure 1:
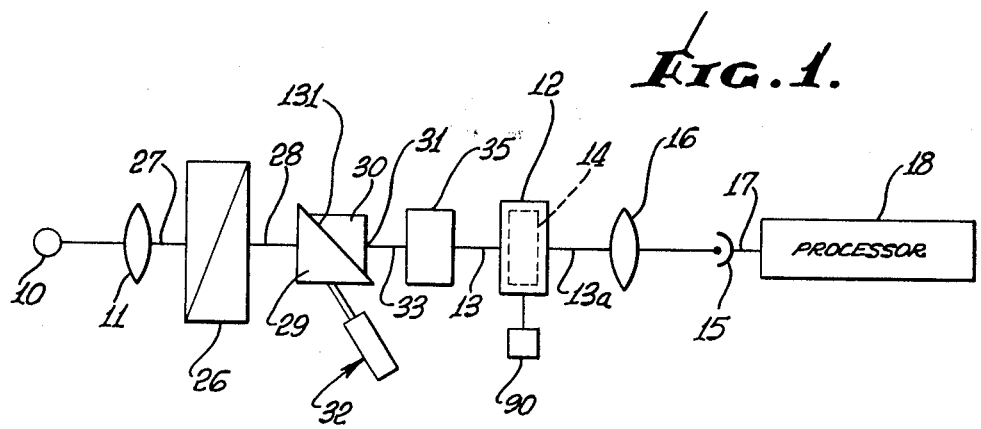
FIG. 1 is an overall system diagram.
Figure 2:
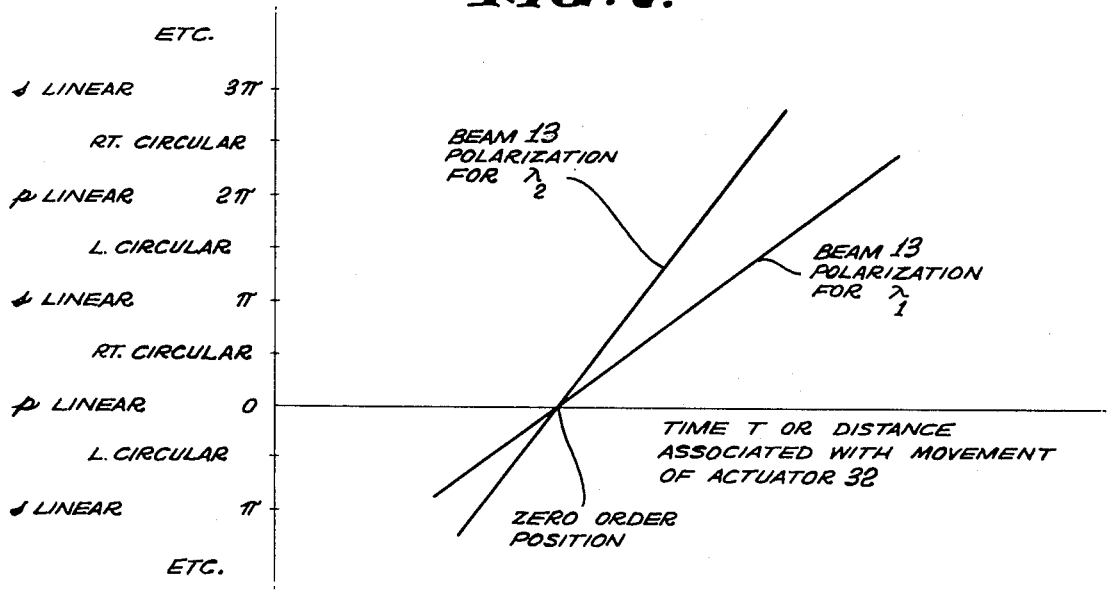
FIG. 2 is a diagram illustrating fluctuation of polarization as a function of time, for two wavelengths.

Referring first to FIG. 1, having to do with measurement of circular dichroism, a light source and collimating lens are indicated at 10 and 11, the source providing broadband electromagnetic radiation such as light of different wavelengths $\lambda$. Between the source and the sample apace 12 is located what may be referred to generally as polarization interferometer means including a linear polarizer 26, and relatively fixed and movable prisms 30 and 29, respectively, for processing source light to provide a beam at 13 characterized, for each wavelength, by ellipticity that alternates between left and right circular polarization and between which the beam polarization becomes linear with direction alternating from one which may be referred to as "parallel" or $p$, to one which may be referred to as "perpendicular" or $s$, such notation being conventional, the frequency $\nu$ of such alternation being a function of light wavelength, i.e., $$\nu_a = F(\lambda_a) \quad (1)$$

where $a$ = number associated with particular wavelengths $\nu_a$ = ellipticity alternation frequencies associated with particular wavelengths FIG. 2 depicts such fluctuation of polarization as a function of time t, for particular wavelengths $\lambda_1$, and $\lambda_2$, and may be generalized to other wavelengths by including lines of other slopes representative of other wavelengths, each passing through the zero optical phase axis at the zero order point. At the latter point, the combined thicknesses of the two prisms are equal to that of the compensating block, 35, if all are made of the same material. In the interferometer of FIG. 1, the slope of each line is inversely proportional to the birefringence of the prism material for the corresponding wavelength.

The sample space 12 is located for effecting passage of the beam 13 through, for example, a circularly dichroic sample 14 in that space, the sample typically differentially absorbing the left and right circularly polarized light of a characteristic wavelength. A beam intensity detector 15 is located in the path of the beam 13a that has passed from the sample space 12, a condenser or other optics 16 typically being inserted in the beam path to reduce the size of the beam at the detector. The intensity of the detector output signal at 17 is characterized as varying with frequencies $\nu_a$ when the sample 14 is in the space 12.

Figure 3:
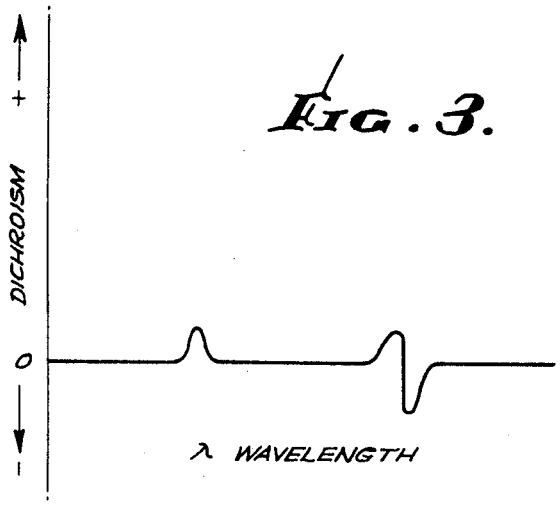
FIG. 3 is a waveform illustrating dichroism as a function of wavelength.

The detector output, an interferogram function F ($\nu_a$), is subsequently processed by apparatus generally designated at 18 to produce dichroic spectra varying with wavelength $\lambda$, as seen in FIG. 3.

In the absence of a sample, the detector ideally produces a constant (or DC) output, except for noise or random fluctuations. The term "ideally" is used because a detector which is completely free of response to linear polarization is very unusual. In practice, advantage is taken of the fact that the circular dichroism is at quadrature with the signal resulting from linear effects, and can, therefore, in principle, be completely isolated from the linear response in the computation. In practice, of course, this isolation is never complete, but by careful adjustment and design it may be very helpful.

Figure 1A:
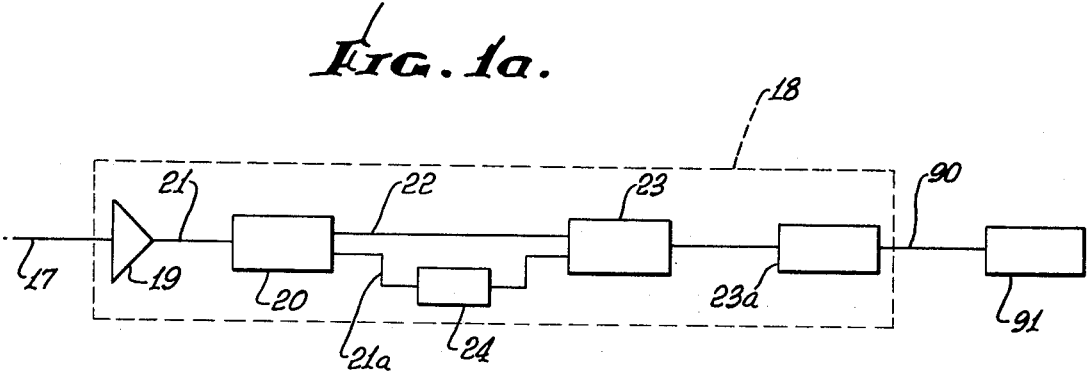
FIG. 1a is a component block diagram.

The illustrated apparatus 18 may, as seen in FIG. 1a, include an amplifier 19 the input of which is connected to receive the detector output 17; a digitizer 20 (as for example an analog to digital converter) connected to receive the analog output 21 of the amplifier to provide a corresponding digital output 22; and a digital computer 23 operatively connected with the digitizer to derive a Fourier transmittance dichroism spectrum $\Delta T_{L-R}$ ($\lambda$) or $\Delta T_{p-s}$ ($\lambda$) as indicated, and in accordance with the equation $$\Delta T_{(L-R)} \text{ or } \Delta T_{(p-s)} = \int_{\sqrt{1}}^{\sqrt{2}} F(\sqrt{a}) x M(\lambda_a) d\sqrt{}$$

the demodulation function $M$ ($\lambda$) being defined below.

A Fourier spectroscopy transmittance spectrum $T$ ($\lambda$) is derived for the ordinary transmission of the same sample, as is conventional, and the computer component 23a then divides $\Delta T_{L-R}$ ($\lambda$) by $T$ ($\lambda$) to obtain at output point 90 the approximate absorbance spectrum $\Delta A_{L-R}$ ($\lambda$) corresponding to circular dichroism, as is represented in FIG. 3. The linear dichroism is obtained by dividing $\Delta T_{p-s}$ by the value of $T$ ($\lambda$) obtained with no sample present. A linear or circular dichroism display is indicated at 91 in FIG. 1a. If desired, output 21a from the digitizer may be recorded by recorder 24, which may preferably include a digital memory, for later processing by the computer. The interferometer means to provide beam 13 may have an associated scan velocity V characterized in that, for any selected wavelength $\lambda_a$ of the light provided by source 10, there is an associated frequency $\nu_a$ of beam ellipticity alternation as described above, and as may for example be represented by the following equation:

$$\nu_a = (kVB_a) \quad (2)$$

In this equation, $k$ is a constant proportional to the sine times the cosine of the prism angle, and $B_a$ is the birefringence for wavelength $\lambda_a$. This equation represents one form which Equation (1) may take, and means to be described will, in general, function to satisfy Equation (2). Equation (2) may be looked upon as representing the condition that each wavelength $\lambda_a$ goes through the polarization cycle at a characteristic speed. Thus, in FIG. 2, wavelength $\lambda_1$, goes through the polarization cycle with a period $T_1$ associated with frequency $\nu_1$; whereas, the wavelength $\lambda_2$ goes through its polarization cycle with a period $T_2$ associated with frequency $\nu_2$, $T_2$ being different from $T_1$ in general. Note that these occur for the same scan velocity $r$ of relatively movable structures in the interferometer means to be described.

In FIG. 1, the linear polarizer 26 operates upon source light 27 to linearly polarize same. The resultant beam 28 then passes through the movable prism 29, fixed prism 30, and compensator block 35, these defining a Babinet-Soleil compensator as is known in the art. Bi-refringent prisms 29 and 30 have their axes at 45° to the plane of polarization of the incident beam 28 of radiation (visible or infra-red, for example), whereby the latter is resolved into components respectively coincident with the prism axis and at 90° thereto; further, one component travels faster through the material than the other component so that upon their re-combination at the point of emergence 31, a phase shift occurs. In addition, as the prism 29 is moved by the actuating means 32 parallel to plane 131 and relative to prism 30 to vary the total thickness of the compensator in the direction of beam 28, the phase shift for each different wavelength of such radiation undergoes a change. The angles of prisms 29 and 30 are equal so as to maintain the same phase for any one wavelength over the entire useful aperture of the prism pair, as is well known. Prisms 29 and 30 may consist of quartz or calcite, and have substantially equal angles. The axis of prism 30 is characteristically oriented in the same direction as the axis of prism 29.

A bias plate 35, of the same material as prism elements 29 and 30, may be inserted in the path of beam 33, the plate 35 having an axis orthogonal to the axes of prism elements 29 and 30, and its use being to permit the interference state of all wavelengths to pass through the position of zero retardation. In this regard, when the total thickness of prisms 29 and 30 in the direction of beams 28 and 33 is equal to the thickness of the bias plate in the direction of beam traversal there-through, the net retardation is zero, for all wavelengths.

The resultant beam 13 has associated polarization modulation described below in connected with FIG. 4. In this regard, the time coordinate $T$ as shown in FIG. 2 may be looked upon as determining the phase difference $\Delta\phi$ between the orthogonal vector components, or as corresponding to the distance of travel of actuator 32.

A demodulation function $M$ ($\lambda$) referred to above may be derived as discussed below to provide the demodulation cosine or sine function $M$ ($\lambda$), i.e. cos ($\nu_a t$) or sin ($\nu_a t$), required for the generation of the inverse Fourier transform, the cosine or sine corresponding respectively to linear or to circular dichroism, whichever is to be measured. In this regard, the birefringence of all optical materials is nonlinear but is a simple curve which varies monotonically. The frequencies for the demodulation function cannot therefore be derived theoretically as in the case of a Michelson or Mach-Zender interferometer. Instead it must be derived from a predetermined knowledge of the birefringence.

As in the case of the Michelson type interferometer, as described in the heretofore referenced application Ser. No. 48,415, it is also necessary to determine precisely the zero retardation position of the scanning mechanism; for example, with a light source or with a source combining several monochromatic wavelengths. The former is conventional and is described in various text books on the subject of interferometry, such as was described in the article by J. and P. Connes, JOSA Vol. 56, p. 896 (July 1966) and particularly on p. 902.

The birefringence function can be determined by measurement of the refractive index of the crystal for the ordinary and extraordinary rays as described in standard text books on optics, such as that by Francis A. Jenkins and Harvey E. White "Fundamentals of Optics" third edition, McGraw Hill Book Co., Inc. (1957) p. 17. The value is known to high accuracy, being tabulated for instance in the text book by Arthur C. Hardy and Fred H. Perrin "The Principles of Optics" McGraw Hill Book Co. (1932) p. 394.

The phase progression for each wavelength can be calculated from equation (2) and the determined zero retardation point using either a mechanical measurement of V or an optical measurement of V as described in the above referenced paper by Connes. The birefringence data may be stored in a digital computer, and the exact value for each wavelength of interest determined by interpolation using well known techniques of computation.

Samples exist which exhibit both linear and circular dichroism simultaneously. For a complete study the interferogram of such a sample would have to be processed in the computer twice, once with each demodulation function, and the two separate (linear and circular) dichroism spectra of such a sample would then be obtained. The circular dichroism spectrum would show absorption bands which always correspond to some of the wavelength positions for ordinary absorption, whereas the linear dichroism spectrum would not necessarily correspond to the ordinary absorption spectrum although it would commonly do so. To reiterate, the one interferogram carries the information for both linear and circular dichroism spectra.

In the event that a sample and its holder exhibit both linear and circular dichroism and it is desirable to isolate the circular dichroism substantially completely from the linearly dichroic effects, it may be advantageous to rotate the sample and its holder about an axis which is approximately in coincidence with the axis of the optical beam through the sample. Such a rotating means is indicated at 90 in FIG. 1.

The effects of circular dichroism which are of greatest present interest are those of molecules in solution; in other words, in random orientation in space and are for this reason independent of the rotary motion of the specimen.

It is also possible to rotate the specimen at a rate which is low relative to the lowest frequency of the range of frequencies encompassed by $\nu_a$. In this case the linearly dichroic effects will be exhibited as a series of modulations or "beats" at twice the frequency of rotation. If they are small and especially if they are largely cancelled out by the discrimination due to the choice of the sine demodulation function for $M(\lambda)$, it may be easy to discriminate them from the circularly dichroic modulation corresponding to genuine circular dichroism of the specimen.

In still another alternate way of eliminating the effects of the linear dichroism of a container for a liquid specimen it may be possible to find an orientation of the sample holder for which the linear dichroism is zero at all wavelengths within the band of wavelengths being observed. Such an orientation lies at 45° to the directions of maximum dichroism. The spectra are then measured and the computer programmed to disclose the circular dichroism through use of the sine demodulation function resulting from such a scan or series of scans. Means 90 in FIG. 1 may also represent such an orienting device for the holder.

Figure 4:
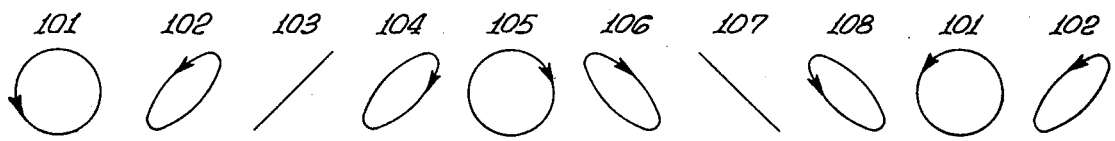
FIG. 4 is a polarization sequence as is characteristic of the invention.

Reference to FIG. 4 shows the modulation character of the recombined beams at 13 as passing through the repeated cyclic sequence of which the illustrated phases represent points on a complete continuously progressing cycle, with arbitrary starting point:

101 — left circularly polarized
102 — elliptically polarized (left)
103 — linearly polarized in the $p$ direction
104 — elliptically polarized (right)
105 — right circularly polarized
106 — elliptically polarized (right)
107 — linearly polarized in the $s$ direction
108 — elliptically polarized (left)
101 — left circularly polarized
etc.

This sequence illustrates only discrete points in a continuous progression of elliptical polarization that results if two coherent beams of linearly polarized radiation are combined coaxially and with their polarization vectors orthogonally oriented, and the phase of one beam is progressively increased with respect to the other.

As is conventional in absorption Fourier spectroscopy, the prism motion may be either stepwise or continuous. Likewise, either the absolute value of the intensity or its differential with respect to pathlength may be measured. The apparatus shown in FIG. 1 may be looked upon as one example of means to produce the above polarization sequence, using prisms.

Figure 5:
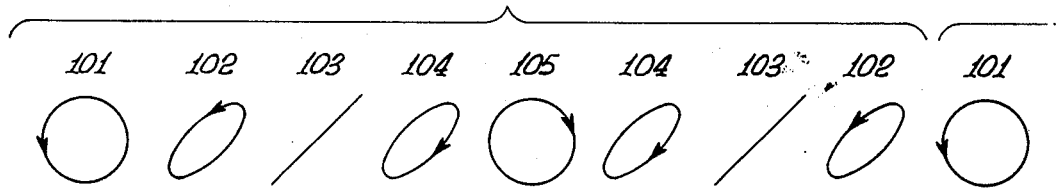
FIG. 5 is a polarization sequence as is characteristic of a conventional electro-optical modulator.

An important difference between the FIG. 4 polarization sequence and that produced by conventional electro-optical modulators (as for example that described in U.S. Pat. No. 3,257,894 to Grosjean) is that in the FIG. 4 sequence the linear phases at 103 and 107 are different, whereas in the sequence produced by the electro-optical modulator the linear phases have the same vector direction. See for example the linear phases 103 in the FIG. 5 sequence as produced by a conventional electro-optical modulator. The latter sequence progresses cyclically through five of the states shown in FIG. 4, beginning with the first state 101 or the third state 103 and going to state 105 or 107, depending upon whether circular or linear dichroism is to be measured. It then returns through the same sequence in reverse, instead of progressing through the states 106, 107 and 108 as in FIG. 4. The Fourier modulator progresses through the complete cycle 101 through 108 to 101 again and then, continuing on, repeats the cycle again in the original sequence.

It is important that a clear distinction be made between operation in the infrared and operation in the ultraviolet or visible regions of the spectrum. It is well known that in the infrared, where measurements are not limited by the statistical arrival of photons, but rather by noise arising in the detector or in the amplifier used with the detector, or caused by the radiation field to which the detector is exposed on all sides, so that the noise per unit frequency bandwidth is substantially independent of the light intensity, the advantage in signal-to-noise ratio attainable through Fourier spectroscopy is much larger than when measurements are made with a good multiplier phototube. In the latter, the noise principally arises from the statistical distribution of arrival of photons and thus increases with the total light intensity falling on the detector. Thus, with the phototube, each added wavelength band included increases the noise in proportion to the square root of the total flux of photons. The increasing noise vitiates the gain which would otherwise occur in signal-to-noise ratio. In other words, while Fourier dichroism measurements may have advantages in the ultraviolet or visible regions of the spectrum, these advantages do not include the so-called "Fellgett advantage" that the time for measurement of a large number of bands simultaneously by Fourier spectroscopy is approximately equal to that required for measurement of a single band by conventional spectroscopy using a monochromator to isolate the wavelength band wanted and to reject other bands.

With respect to passage of the beam through the sample, for pure circular dichroism the sample exhibits no difference in absorption for linearly polarized light, no matter how it is oriented in the beam. In the case of linear dichroism, exactly the opposite occurs. The sample, when oriented correctly in the beam, shows a difference in absorption for linearly polarized radiation with one direction of linear polarization from that with the orthogonal direction of linear polarization. If the sample is purely linearly dichroic, it shows no difference in absorption for the circularly polarized components.

Since the signal for pure linear dichroism is, at a given wavelength, exactly in quadrature with the signal for pure circular dichroism, these two signals can be independently demodulated by the cosine and sine demodulation function, respectively.

I claim:

1. In dichroism measurement apparatus that includes:
   a. a source of electromagnetic radiation of different wavelengths $\lambda$,
   b. a linear polarizer operable upon said source radiation to linearly polarize same,
   c. interferometer means for processing the linearly polarized source radiation to provide a beam characterized, for each wavelength, by ellipticity that alternates between left and right circular polarization and between which the beam polarization becomes linear in one direction as the ellipticity alternates from left to right circular polarization, and linear in the orthogonal direction as the ellipticity alternates from right to left circular polarization, the characteristic frequency $\nu_a$ of such alternation varying as a function of the wavelength,
   d. a sample space located for effecting passage of the elliptically polarized beam through a dichroic sample in that space, the sample differentially absorbing the alternately polarized radiation of a characteristic set of wavelengths $\lambda$, and
   e. a beam intensity detector located in the path of the beam passing from the sample space and characterized as having signal output that varies in intensity with frequency $\nu_a$ when said sample is in said space, said output adapted for processing to produce dichroic spectra varying with wavelength $\lambda$, the improvement comprising,
   f. said means comprising two prisms, at least one of which is movable with respect to the other, both having axes at 45° to the linear polarization direction, and actuating means for effecting such relative movement of said prisms to control said frequencies $\nu_a$.

2. The combination of claim 1 including a bias plate in the path of the radiation that has passed through said prisms, the bias plate having its axis directed orthogonally relative to the axes of the prisms.

3. The combination of claim 2 wherein said two prisms have a position in which their combined thickness equals the thickness of the bias plate.

4. The combination of claim 1 wherein both prisms consist of quartz.

5. The combination of claim 3 wherein said prisms consist of uniaxial crystalline material of substantial birefringence.

6. The combination of claim 1 including means for processing the output of the detector to produce said dichroic spectra varying with wavelength $\lambda$.

7. The combination of claim 1 wherein said prisms are defined by a Babinet-Soleil compensator.

8. The combination of claim 1 wherein said sample space is defined by a sample holder, and including means for controllably rotating said holder.

* * * * *